Patented Nov. 2, 1943

2,333,527

UNITED STATES PATENT OFFICE 2,333,527

ARTIFICIAL FILAMENT

Russell O. Denyes and Bruce B. Allen, Pittsburgh, Pa., assignor to Tubize Chatillon Corporation, a corporation of Delaware No Drawing. Application February 8, 1941, Serial No. 378,058

8 Claims. (Cl. 18—54)

This invention relates to the production of artificial filaments, and in particular to artificial filaments composed principally of a mixture of regenerated cellulose and a protein derivative. The invention has for its object the provision, as a new article of manufacture, of artificial filaments composed principally of regenerated cellulose and a sulfoxylate derivative of glycinin (soybean protein), as well as the method of making the same.

It is known that alkaline solutions of protein may be incorporated into a viscose solution, and the resulting mixture extruded or spun into an acidic coagulating bath to give an artificial filament which exhibits certain protein characteristics. The usual alkaline solution of soybean protein, however, has several disadvantages when employed for this purpose. This protein is decomposed rapidly in the presence of the high concentration of sodium hydroxide in a viscose solution. This decomposition is evidenced by the strong odor of ammonia liberated in a very few minutes after mixing the usual alkaline solution of soybean protein with viscose. As a result of this decomposition, the yarn obtained on spinning such a mixture has a much lower tensile strength than that of the corresponding viscose yarn spun under similar conditions.

As pointed out in the copending patent application of Russell O. Denyes, Serial No. 333,773, filed May 7, 1940, the solubility in dilute alkaline solutions of some proteins (e. g. soybean protein) is greatly increased by treating the protein with a hydroxyalkyl sulfoxylate, such as sodium formaldehyde sulfoxylate. The protein may be undenatured or partially or completely denatured by heat or certain organic solvents such as alcohol. Suitable dispersions may be prepared by treating soybean protein with an aldehyde or ketone sulfoxylate and dispersing the resulting product in an aqueous solution of an inorganic or an organic base. When such a dispersion is acidified, a precipitated product is formed which is much less soluble in alkaline solutions than is the original protein. Since soybean protein is essentially impure glycinin, the product of the reaction in an alkaline solution of soybean protein and a hydroxyalkyl sulfoxylate may be considered a "hydroxyalkyl sulfoxylate derivative of glycerin," and the product precipitated by acidifying that reaction product may be considered "precipitated glycinin alkyl sulfoxylate."

The present invention contemplates, as a new article of manufacture, an artificial filament composed of regenerated cellulose in combination with one or more precipitated glycinin alkyl sulfoxylates. In its preferred forms the artificial filament of the invention is composed of regenerated cellulose and a precipitated alkali-metal (e. g. sodium) glycinin methyl sulfoxylate or precipitated zinc glycinin methyl sulfoxylate or a mixture of such glycinin methyl sulfoxylates.

Such artificial filaments are produced by extruding or spinning a dispersion (i. e. spinning solution) consisting of a mixture of viscose and one or more hydroxyalkyl sulfoxylate derivatives of glycinin into an acidic precipitating or spinning bath. The alkaline dispersion of the hydroxyalkyl sulfoxylate derivative of glycinin possesses a number of advantages over the usual alkaline solutions of soybean protein. The treatment of the protein with a hydroxyalkyl sulfoxylate, as for example sodium formaldehyde sulfoxylate, greatly increases the solubility of the protein, and thus permits the utilization of much more concentrated dispersions than would otherwise be possible. Furthermore, such dispersions do not show as marked a tendency toward gelation, the glycinin derivative is not as rigidly decomposed by alkalies, and dispersions of the derivative are not as subject to putrefaction as the usual alkaline solutions of soybean protein. A still further advantage of such dispersions, and one of particular importance, is that the glycinin may be undenatured or partially or completely denatured. For these and other reasons, such dispersions of hydroxyalkyl sulfoxylate derivatives of glycinin are peculiarly adapted for admixture with viscose, and the resulting mixture yields, on spinning and finishing, artificial filaments and yarns of high tensile strength which possess protein characteristics, such, for example, as affinity for wool or silk type dyes.

The method of the invention consists essentially in dispersing glycinin in an alkaline solution in the presence of a hydroxyalkyl sulfoxylate, mixing the resulting dispersion with a viscose solution of the type now commonly used in the production of artificial filaments, spinning the resulting mixture in an acidic spinning bath, and collecting from the spinning bath the resulting filaments. The ratio of protein to cellulose in the spinning mixture may vary widely, depending upon the particular properties desired in the finished filament or yarn. In practicing the invention we have obtained excellent results with ratios of protein to cellulose varying from around 1:25 to 5:25. The resulting filaments of the precipitated mixture of viscose and glycinin alkyl sulfoxylate are appropriately collected, and subjected to suitable aftertreatment and finishing operations, such as washing, desulfurizing, rewashing, conditioning, etc. Desulfurizing is desirable to remove the adhering sulfur liberated in the course of the precipitation of the viscose in the acidic spinning bath. The finished filament is an intimate combination or mixture of the regenerated cellulose and the precipitated glycinin alkyl sulfoxylate or sulfoxylates.

Any of the procedures described in the aforementioned patent application (Ser. No. 333,773) for dispersing glycinin in an alkaline solution in the presence of a hydroxyalkyl sulfoxylate may be employed in preparing hydroxyalkyl sulfoxylate derivatives of glycinin for the practice of the invention. The water-soluble hydroxymethyl sulfoxylates, of which sodium formaldehyde sulfoxylate and zinc formaldehyde sulfoxylate are examples, are particularly available and satisfactory hydroxyalkyl sulfoxylates for the practice of the invention. All of the alkali-metal salts (including ammonium) of formaldehyde sulfoxylic acid have a satisfactory dispersing action on glycinin. The sodium, potassium and lithium salts have essentially the same dispersing action and can be used interchangeably without affecting to any great extent the properties of the resulting dispersion, while the ammonium salt gives a dispersion of somewhat different appearance and properties. A wide variety of agents may be employed to impart the contemplated alkalinity to the solution in which the dispersion of the glycinin is promoted by the hydroxyalkyl sulfoxylate. Sodium hydroxide is ordinarily the most available and satisfactory agent, but ammonium hydroxide, potassium hydroxide, calcium hydroxide, methyl amine, ethylene diamine, and triethanolamine may be used.

In order to describe the invention more fully, the following examples are given. These examples illustrate certain of the ways in which the dispersion (i. e. spinning solution) of mixed viscose and a hydroxyalkyl sulfoxylate derivative of glycinin may be prepared, and some of the conditions under which the dispersions are spun into artificial filaments. It is to be understood however that these examples are merely illustrative of the invention and are not to be construed as limiting its scope.

*Example I*

Air-dry soybean protein (218 g.) was suspended in water (1200 g.) and stirred vigorously as the temperature of the suspension was raised to the boiling point (30 minutes) and maintained at this temperature for 30 minutes. Additional water was added from time to time to replace that lost by evaporation. The weight of the suspension was then adjusted to 1500 g. by addition of crushed ice, and the mixture was cooled rapidly to 25° C. in an ice bath. Sodium formaldehyde sulfoxylate (75 g.) was added and the mixture was stirred for 1 hour. Then sodium hydroxide (16.5 cc.; 50% NaOH) was introduced and the stirring was continued for 4 hours.

A portion (28.4 g.) of the above dark green, viscous dispersion was mixed with viscose (900 g.) 18 hours prior to spinning, filtered and then aged until spinning time at 18° C. The viscose contained 7.5% cellulose and 6.8% sodium hydroxide. The ammonium chloride index of the mixture at the spinning time was 10.0.

The spinning was carried out on an experimental spinning machine of the type commonly employed in the spinning of viscose rayon by the spool or bobbin method. The spin bath contained 9% sulfuric acid, 20% sodium sulfate, and 0.3% zinc sulfate, and was maintained at 55° C. The yarn was spun vertically through 13 inches of spin bath at a take-up speed of 82 meters per minute. The yarn was washed with hot (60° C.) water, desulfurized with an ammonium sulfide solution (25° C.), rewashed with hot (60° C.) water, dried at 55° C. in a current of air, and then conditioned at 70° F. and 65% relative humidity. The yarn, which was shown by analysis to contain 4.4% protein, possessed wool dyeing characteristics, and was further characterized as follows: titer, 151.6 deniers; dry strength, 2.3 g./d. (grams per denier); wet strength 1.1 g./d.; dry elongation, 22.2%; wet elongation, 28.5%. The viscose used in the foregoing mixture when spun under the same conditions gave a yarn which possessed the following characteristics: titer, 150.5 deniers; dry strength, 2.3 g./d.; wet strength, 1.1 g./d.; dry elongation 22.3%; wet elongation 30.9%.

*Example II*

A dispersion of soybean protein (60.7 g.) prepared as described in Example I was mixed with viscose (900 g.). The mixing, aging, spinning of the mixture, and the treatment of the yarn were carried out as described in Example I. At the spinning time the ammonium chloride index of the mixture was 9.8. The yarn obtained, which on analysis was shown to contain 8.5% protein, possessed the following characteristics: titer, 153.6 deniers; dry strength, 2.2 g./d.; wet strength 1.0 g./d.; dry elongation, 20.6%; wet elongation 26.9%. This yarn adsorbed wool dyes somewhat more readily than that produced in Example I. For a comparison of the physical properties of this yarn with that spun from the same viscose under the same conditions see Example I.

*Example III*

A dispersion of soybean protein (125.5 g.) prepared as described in Example I was mixed with viscose (825 g.). The mixing, aging, spinning of the mixture, and the treatment of the yarn were carried out as described in Example I. At the spinning time the ammonium chloride index of the mixture was 8.2. The yarn obtained, which on analysis was shown to contain 15.8% protein, possessed the following characteristics: titer, 153.4 deniers; dry strength, 2.0 g./d.; wet strength, 0.8 g./d.; dry elongation 15.5%; wet elongation, 17.9%. This yarn adsorbed wool dyes somewhat more readily than that produced in Example II. For a comparison of the physical properties of this yarn with that spun from the same viscose and under the same conditions see Example I.

*Example IV*

Air-dry soybean protein (145 g.) was suspended in water (700 g.) and stirred vigorously as the temperature was raised to the boiling point (30 minutes), and maintained at this temperature for 30 minutes. Additional water was added from time to time to replace that lost by evaporation. The weight of the suspension was then adjusted to 1000 g. by the addition of crushed ice, and the mixture was cooled rapidly to 25° C. in an ice bath. Zinc formaldehyde sulfoxylate (41.5 g.) was added, and the suspension was stirred for 1 hour. Then sodium hydroxide (29 cc.; 50% NaOH) was introduced, and the stirring was continued for 4 hours.

A portion of the above dispersion (97 g.) was mixed with viscose (900 g.) so that the resulting mixture contained cellulose and protein in the ratio of 17:3. The mixing, aging, spinning of the mixture, and the treatment of the yarn were carried out essentially as described in Example I. The yarn characteristics were as follows: titer, 153 deniers; dry strength, 2.1 g./d.; wet strength 0.95 g./d.; dry elongation 17.8%; wet elongation, 27.0%. The yarn possessed wool dyeing characteristics. It was somewhat softer and had only very slightly lower tensile strength than the corresponding yarn in which sodium formaldehyde sulfoxylate was used in dispersing the protein.

Replacement of parts of the sodium formaldehyde, in Example I, by zinc formaldehyde sulfoxylate produces an increase in the viscosity of the dispersion of the glycinin derivative, changes its color from a dark green to a straw color, and gives a somewhat lighter colored and softer finished yarn. Where such a replacement is made, the artificial filament consists of regenerated cellulose in combination with precipitated sodium glycinin methyl sulfoxylate and precipitated zinc glycinin methyl sulfoxylate.

The new class of artificial filaments made in accordance with the invention possess many useful attributes. Since these filaments consist of both a protein derivative and regenerated cellulose, they exhibit chemical and certain physical properties characteristic of both protein fibers and cellulose fibers. For example, the protein fiber wool has an affinity for both acidic and basic dyestuffs, possesses heat insulating properties, etc. On the other hand, regenerated cellulose may be prepared which has a much higher tensile strength than does wool. By combining cellulose and protein in accordance with this invention, a group of yarns are obtained which possess high tenacity and at the same time show protein characteristics. The extent to which any given type of yarn in this group possesses protein or cellulose characteristics depends upon, but is not directly proportional to, the cellulose:protein ratio. Thus, all of these yarns adsorb the typical dyestuffs used for wool or silk and those used for viscose rayon. However, the extent to which the dyes are adsorbed depends upon the composition of the particular type of yarn. On ignition they burn in a manner similar to viscose rayon, but with evolution of an odor reminiscent of scorched feathers.

In their physical properties, filaments of the invention are governed largely by the methods employed in their manufacture. By spinning them according to the general principles of viscose rayon manufacture, they assume the form of smooth, lustrous, continuous threads. By spinning them according to the general principles of viscose staple fiber manufacture, particularly by cutting them into uniform lengths in the range of 2-10 inches shortly after extrusion and prior to any deacidification treatment, they can be made to assume the form of crimpy, fluffy, wool-like fibers.

The refractive indices of these filaments are very close to that of viscose rayon, although increasing the concentration of the protein raises the refractive index of the filaments somewhat. Hence by incorporating chemically inert pigments or other finely divided foreign substances having refractive indices substantially removed from 1.52 in the dispersion prior to filtration and spinning, their opacity and luster may be controlled to suit market preferences.

In color, artificial filaments of the invention resemble generally conventional viscose rayon, although a slight yellowish cast is imparted as the protein component is increased. They can be bleached by the known methods for the bleaching of wool, for example, by the use of hydrogen peroxide.

In the form of continuous-filament threads, they may, after suitable application of surface lubricants or sizing, be woven and knitted after the manner of ordinary viscose rayon. In the form of staple fiber, they may be carded, combed, drafted and spun after the manner of cotton and wool fibers, or viscose staple fiber. They may be used in combination with the known artificial and natural fibers, and by virtue of this fact some unusual and useful textiles can be developed with their help. Thus, for instance, artificial filaments of the invention may be embodied in men's suitings, men's shirtings, ladies' dress goods, hosiery and other wearing apparel goods, either as a diluent for wool, or as an adjunctive material designed to produce novel cross-dyeing effects and to improve the thermal properties, especially in textiles composed largely of non-nitrogenous yarns.

With respect to "hand," artificial filaments of the invention are very similar to conventional viscose rayon, although the presence of the glycinin derivative appears to lend a sense of loftiness and featheriness not detected by the touch in handling ordinary viscose rayon or staple fiber. It will be understood by those familiar with the art of producing artificial filaments, however, that the "hand" can be modified by varying the unitary filament titer, by modifying the spin bath composition in relation to the take-up speed, by varying the index of ripeness at the time of spinning, by the application of surface dressings, and the like.

We claim:

1. An artificial filament resulting from the precipitation in an acid bath of a homogeneous mixture of viscose, and an alkaline solution of glycinin and a hydroxy-alkyl sulfoxylate.

2. An artificial filament resulting from the precipitation in an acid bath of a homogeneous mixture of viscose, and an alkaline solution of a glycinin and a hydroxymethyl sulfoxylate.

3. An artificial filament resulting from the precipitation in an acid bath of a homogeneous mixture of viscose, and an alkaline solution of glycinin and sodium hydroxymethyl sulfoxylate.

4. An artificial filament resulting from the precipitation in an acid bath of a homogeneous mixture of viscose, and an alkaline solution of glycinin and zinc hydroxyalkyl sulfoxylate.

5. An artificial filament resulting from the precipitation in an acid bath of a homogeneous mixture of viscose, and an alkaline solution of glycinin and zinc hydroxymethyl sulfoxylate.

6. An artificial filament resulting from the precipitation in an acid bath of a homogeneous mixture of viscose, and an alkaline solution of glycinin, alkali-metal hydroxyalkyl sulfoxylate and zinc hydroxyalkyl sulfoxylate.

7. An artificial filament resulting from the precipitation in an acid bath of a homogeneous mixture of viscose, and an alkaline solution of glycinin, alkali-metal hydroxymethyl sulfoxylate and zinc sulfoxylate.

8. An artificial filament resulting from the precipitation in an acid bath of a homogeneous mixture of viscose, and an alkaline solution of denatured glycinin and hydroxyalkyl sulfoxylate.

RUSSELL O. DENYES.
BRUCE B. ALLEN.

CERTIFICATE OF CORRECTION.

Patent No. 2,333,527.  November 2, 1943.

RUSSELL O. DENYES, ET AL.

It is hereby certified that error appears in the printed specification of the above numbered patent requiring correction as follows: Page 3, first column, line 6, for "parts" read --part--; and second column, line 64, claim 7, before "sulfoxylate" insert --hydroxymethyl--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.